United States Patent
Tett

(10) Patent No.: US 10,275,019 B1
(45) Date of Patent: Apr. 30, 2019

(54) VIRTUAL REALITY LOCOMOTION DEVICE

(71) Applicant: Richard J. Tett, Plano, TX (US)

(72) Inventor: Richard J. Tett, Plano, TX (US)

(73) Assignee: HoboLoco Inc., Plano, TX (US)

( * ) Notice: Subject to any disclaimer, the term of this patent is extended or adjusted under 35 U.S.C. 154(b) by 0 days.

(21) Appl. No.: 15/874,701

(22) Filed: Jan. 18, 2018

(51) Int. Cl.
| | |
|---|---|
| *G06F 3/033* | (2013.01) |
| *G06F 3/01* | (2006.01) |
| *G06F 3/0338* | (2013.01) |
| *G06F 3/038* | (2013.01) |

(52) U.S. Cl.
CPC .............. *G06F 3/011* (2013.01); *G06F 3/016* (2013.01); *G06F 3/038* (2013.01); *G06F 3/0334* (2013.01); *G06F 3/0338* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,817,950 | A | | 4/1989 | Goo |
| 5,860,861 | A | | 1/1999 | Lipps et al. |
| 5,864,333 | A | * | 1/1999 | O'Heir ............... A63C 17/12 180/181 |
| 5,872,438 | A | | 2/1999 | Roston |
| 5,913,684 | A | * | 6/1999 | Latham ............... G06F 3/011 434/247 |
| 6,351,096 | B1 | * | 2/2002 | Jang ............... B66B 25/00 187/292 |
| 7,153,242 | B2 | | 12/2006 | Goffer | 
| 8,398,110 | B2 | | 3/2013 | Tedla |
| 8,979,722 | B2 | | 3/2015 | Klein et al. |
| 9,522,324 | B2 | | 12/2016 | Levasseur et al. |
| 2008/0261696 | A1 | | 10/2008 | Yamazaki et al. |
| 2009/0058855 | A1 | | 3/2009 | Mishra et al. |
| 2009/0111670 | A1 | | 4/2009 | Williams |
| 2011/0306425 | A1 | | 12/2011 | Rivard et al. |

(Continued)

FOREIGN PATENT DOCUMENTS

WO    WO 2016042407 A1    3/2016

OTHER PUBLICATIONS

CH Products, Pro Pedals USB Flight Simulator Pedal, website and product.

(Continued)

*Primary Examiner* — Van N Chow
(74) *Attorney, Agent, or Firm* — David W. Carstens; Carstens & Cahoon, LLP

(57) ABSTRACT

A device with rotatable footpads for locomotion simulation in a virtual reality environment and method for same are disclosed. The apparatus comprises; a stanchion for supporting two footpads, wherein the two footpads rotate on an axis passing through the stanchion; a plurality of sensors that detect the rotation of each footpad; and a controller transmitting signals from the plurality of sensors representing the rotation of each footpad to a virtual reality system. The method for using the apparatus comprises: stabilizing footpads of a virtual reality locomotion apparatus using motors controlled by a locomotion controller; detecting the rotation of the footpads on an axis passing through the footpads via sensors of the footpads that detect rotation of the footpads; and transmitting a digital representation of the rotation of the footpads to a virtual reality system.

20 Claims, 7 Drawing Sheets

(56) References Cited

U.S. PATENT DOCUMENTS

| | | |
|---|---|---|
| 2013/0344926 A1 | 12/2013 | Claudel et al. |
| 2017/0160793 A1 | 6/2017 | Perlin et al. |
| 2017/0185168 A1* | 6/2017 | Bonora ................ G06F 3/0334 |
| 2017/0217529 A1 | 8/2017 | Chen |
| 2018/0326286 A1 | 11/2018 | Rathi et al. |

OTHER PUBLICATIONS iKKEGOL, USB Double 2 Foot Switch Control Pedals, product.
Thrustmaster, T150 Force Feedback Racing Wheel and Pedals for PlayStation 4, product.
Amadeo, Ron, "Forget VR Treadmills—Google Patents Motorized, Omnidirectional VR Sneakers", ArsTechnical.com, Nov. 19, 2018, 4 pages.

* cited by examiner

VIRTUAL REALITY LOCOMOTION DEVICE

BACKGROUND OF INVENTION

1. Field of Invention

The present invention relates to display systems, specifically, controllers for interacting with display systems.

2. Description of Related Art including Information Disclosed under 37 C.F.R. 1.97 and 1.98

Virtual reality systems have recently become more and more predominant as visual displays, whether in use with video or electronic games or with other types of visual media. Today, interactive virtual reality systems are becoming a household item, especially with the growth of uses for virtual reality systems. Virtual reality systems can be used not only for video or electronic games, but they can be used for research and educational purposes.

However, problems do persist in the area of virtual reality systems. Because virtual reality systems are meant to visually simulate an environment, users of virtual reality systems have difficulty interacting with these systems while also ensuring their safety in real life. For example, virtual reality users use headsets that generate realistic images and sounds to simulate the users' physical presence in a virtual or imaginary environment; however, in these environments, users want to interact with the virtual or imaginary environment and will physically move to interact with the virtual or imaginary environment. Often, users who move according to a virtual or imaginary environment will encounter an obstacle in real life, and current controllers and devices used for virtual reality do not account for locomotion in real life and in virtual reality.

There are several devices that do simulate travel or locomotion in a virtual reality system while the users are stationary. One of which are foot-controlled devices. One representative of this is a product known commonly as the "3dRudder". This product is disclosed in U.S. Pat. Application No. US20170185168 by Bonora, et al and European Pat. Application EP20150798185 (WO 2016042407 A1) by Bonora, et al. While a contribution in the field, the 3dRudder and like devices are disadvantageous in that they require the user to be seated and use their legs and feet together in an unnatural way—especially in the control of rotation—which may lead to back pain and exhaustion. Furthermore, the sense of motion is conveyed only by visual changes in the Virtual Reality and no perception of travel or rotation is conveyed through the feet, legs, body or skin. Although the 3dRudder is capable of moving in several directions, it can only indicate travel in a series of linear vectors, similar to a joystick. It is not possible to travel in an arc, rotate in place, or travel backward in an arc. Inconsistent motion cues between sight and body contributes to disorientation and sickness while navigating a Virtual Reality environment. This product provides movement in a single plane, but offers no capability or option to control vertical ascent/descent.

Another foot-controlled device is disclosed in U.S. Pat. Application No. US2017/0160793 by Perlin, et al. This invention comprises a mat comprising pressure sensitive tiles upon which a user stands and manipulates the distribution of weight to various parts of each foot. The pressure distribution "image" is analyzed and movements forward, backward and sideways may be indicated. Although a user can be trained to use the mat to effect motion in a Virtual Reality system, it is disadvantageous as a virtual vehicle for locomotion for several reasons. Firstly, it is a homogenous surface with no physical attributes typical of a mechanism by which a foot controls acceleration or direction. Secondly, there is no feedback to the feet other than the pushback of the surface, so the user is left to imagine that their feet are moving control surfaces typical of a vehicle. It is well-known that when a person perceives movement through his eyes without any other sensations of movement, they may experience virtual reality sickness with symptoms including headache, disorientation, nausea, etc. Many available devices for VR locomotion, including this one, do not provide active feedback of movement to remediate this problem. Thirdly, the logic by which the mat depressions are interpreted must be calibrated for users based on their weight and foot size.

Other types of currently available devices are disclosed in U.S. Pat. 9,522,324 B2 by Levasseur, et al; U.S. Pat. No. 5,864,333 by O'Heir; U.S. Pat. No. 4,817,950 by Goo; U.S. Pat. Application No. US20080261696 by Yamazaki, et al.; U.S. Pat. No. 5,860,861 by Lipps, et al.; U.S. Pat. No. 5,872,438 by Roston; U.S. Pat. Application No. US20130344926 by Claudel, et al.; U.S. Pat. Application No. 20090058855 by Mishra, et al.; U.S. Pat. Application No. 20090111670 by Williams; U.S. Pat. No. 8,979,722 by Klein, et al.; U.S. Pat. No. 8,398,100 by Tedla; and U.S. Pat. Application No. 20110306425 by Rivard, et al.

What is needed is a device that simulates locomotion in a virtual reality system while the user does not physically travel or encounter barriers or does not require restraints (as do omnidirectional treadmills), that rotates in place, and that makes the user feel like he is moving.

BRIEF SUMMARY

Novel aspects of the disclosures are directed to an apparatus with rotatable footpads for locomotion simulation in a virtual reality environment and method for same. In a first embodiment, the virtual reality locomotion apparatus comprises a stanchion for supporting two footpads. The two footpads rotate on an axis passing through the stanchion. The locomotion apparatus also includes plurality of sensors that detect the rotation of each footpad. The apparatus includes a controller that transmits and receives signals from the plurality of sensors representing the rotation of each footpad to a virtual reality system.

In a second embodiment, novel aspects of the present disclosure describe a method for virtual reality locomotion using a virtual reality locomotion apparatus. The method includes the steps of stabilizing footpads of a virtual reality locomotion apparatus using motors controlled by a controller. Then the rotation of the footpads are detected footpads via sensors of the footpads. The footpads rotate on an axis passing through the footpads. Then, a digital representation of the rotation of the footpads is transmitted from the to a virtual reality system. With these inputs, it is possible for the VR system to represent a character or vehicle traveling straight forward, straight backward, forward or backward in an arc, or rotating in place to any degree.

BRIEF DESCRIPTION OF THE DRAWINGS

The present invention will be more fully understood by reference to the following detailed description of the preferred embodiments of the present invention when read in conjunction with the accompanying drawings, wherein.

Figure 1:
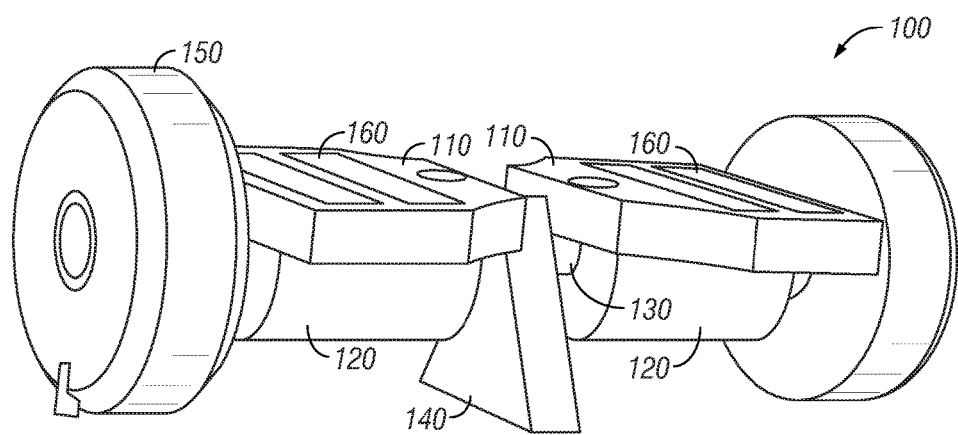
FIG. 1 illustrates an exemplary embodiment of a virtual reality locomotion apparatus.

The above figures are provided for the purpose of illustration and description only, and are not intended to define the limits of the disclosed invention. Use of the same reference number in multiple figures is intended to designate the same or similar parts. Furthermore, when the teens "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION

Several embodiments of Applicant's invention will now be described with reference to the drawings. Unless otherwise noted, like elements will be identified by identical numbers throughout all the figures. The invention illustratively disclosed herein suitably may be practiced in the absence of any element which is not specifically disclosed herein.

FIG. 1 illustrates an exemplary embodiment of a virtual reality locomotion apparatus. In an exemplary embodiment, the virtual reality locomotion apparatus 100 connects to a virtual reality system and simulates locomotion in the virtual reality environment generated by the virtual reality system. The virtual reality locomotion apparatus 100 allows the user to control the locomotion simulation by actuating the various components of the locomotion apparatus 100 to simulate control of virtual reality locomotion. For example, a user can actuate the locomotion apparatus 100 in a certain pattern or orientation to simulate turning left or right in the virtual reality environment.

To operate the exemplary embodiment of the locomotion apparatus 100, the user stands on the footpads 110 of the locomotion apparatus 100. The footpads 110 are disposed on an axle 130 and axial housings 120. The axial housings 120 contain the components for actuating the locomotion apparatus 100. The user can use his feet to actuate the footpads 110, and the footpads 110 and axial supports 120 rotate on the axle 130. The footpads 110 and corresponding axial housings 120 can rotate independently of each other. For example, the left footpad can rotate in an opposite direction from that of the rotational direction of the right footpad. Different rotational orientations of the footpads 110 can simulate changes in direction of locomotion in a virtual reality system.

In an exemplary embodiment, the user can indicate a certain left or right rotation in a virtual reality environment by angling one footpad forward and another footpad backward. For example, to turn counter-clockwise around an axis passing perpendicularly through the center of the device, the user can angle the left footpad down by using the heel of his left foot and can angle the right footpad down by using the ball of his right foot. Similarly, to turn clockwise around an axis passing perpendicularly through the center of the device, the user can angle the left footpad down by using the ball of his left foot and can angle the right footpad down by using the heel of his left foot. Generally, to rotate in either direction, the user can angle the footpads 110 in different and opposite directions to get the correct locomotion rotation in the virtual reality environment.

Additionally, the user can indicate forward or backward motion or locomotion in the virtual reality environment by angling both footpads 110 in a particular direction. For example, to move forward in the virtual reality environment, the user can angle the left footpad and right footpad down by using the balls of both feet, and to move backward in the virtual reality environment, the user can angle the left footpad and right footpad down by using the heels of both feet. If the user angles one footpad more than the other footpad, the user's movement in the virtual reality environment will be in an arc and the front of the user's body in the virtual reality environment will rotate while moving so that the user's body faces the forward direction of the tangent of the arc—whether traveling backward or forward.

In the illustrative embodiment of FIG. 1, the axle 130 is disposed on a stanchion 140 that serves to support the axle 130 and accordingly the weight of the user when he stands on the locomotion apparatus 100. The manner in which the axle 130 passes through and supported by the stanchion 140 is dictated by the connection means between the axle 130 and the stanchion 140. For example, the stanchion 140 can comprise a mount upon which the axle sits and rotates. The connection between the axle 130 and the stanchion 140 can use any other currently available or later developed technology for connecting the two components.

The present exemplary embodiment comprises a stanchion 140 disposed between the footpads. However, in other embodiments, more than one stanchion can be used to support the weight of the users, and stanchions can comprise any arrangement to support the axle 130 and the locomotion apparatus 100. For example, a stanchion can be placed on each end of the locomotion apparatus 100 instead of between the footpads 110. Such stanchion arrangement can provide more support to the apparatus 100 when a user stands on the locomotion apparatus 100. Further, the stanchion 140 can have any shape to accommodate supporting the axle 130 and the footpads 110.

Also shown in the illustrative embodiment of FIG. 1 are wheels 150 that serve to give impression of locomotion. These wheels 150 can also act as stanchions to support the locomotion apparatus 100 when a user stands on the footpads 110.

In one embodiment, strips 160 are disposed of on the top side of the footpads, and these strips 160 are meant to provide friction and stability to the user as he stands on the footpads. Another embodiment uses the strips 160 as sensors, which are discussed in detail below.

The operation of the locomotion apparatus 100 is based on the detection of changes in the footpads 110 by sensors and actuation of motors and environmental simulators in response. These sensors (not illustrated) and motors (not illustrated) can be disposed inside the locomotion apparatus, i.e., inside the footpads 110, the axial housings 120, the stanchion 130, or the wheels 150. Information from the sensors and to the motors are processed by a processor (not illustrated) also disposed inside the locomotion apparatus, and an I/O controller manages the communication between the processor, the sensor, and motors. The processor and the I/O controller can also manage communication from the locomotion apparatus to the virtual reality system. More detail about these components of the locomotion apparatus is discussed below.

Figure 2:
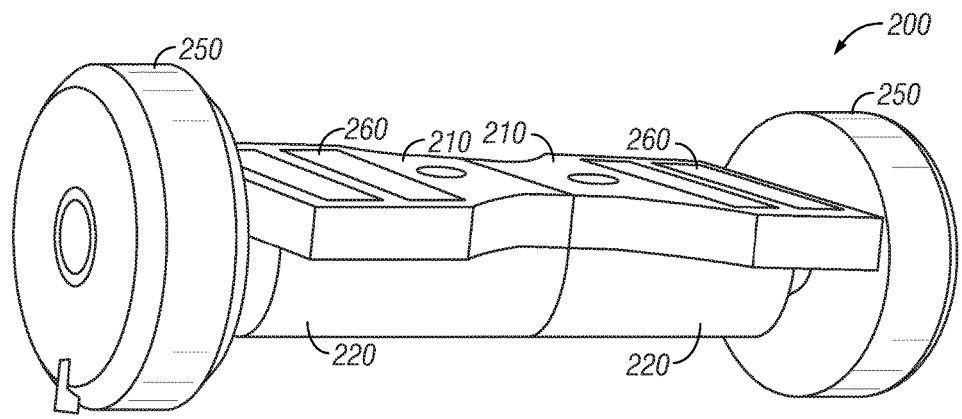
FIG. 2 illustrates an exemplary embodiment of the virtual reality locomotion apparatus.

FIG. 2 illustrates a perspective view of an exemplary embodiment of the virtual reality locomotion apparatus. In this illustrative embodiment, the wheels 250 act as stanchions that keep the locomotion apparatus 200 stationary and support the weight of the user during use of the locomotion apparatus 200. In the present exemplary embodiment, the footpads 210 and the axial housings 220 are designed and shaped to meet at a central plane bisecting the locomotion into two symmetrical halves. Similar to the embodiment of FIG. 1, the present exemplary embodiment comprises an axle (not illustrated) that passes through the axial housings 220 and connects the two wheel stanchions 250. The axle is designed to connect to the center of the wheel stanchions 250. The footpads 210 and axial housings 220 can still rotate independently while disposed on the axle.

Figure 3:
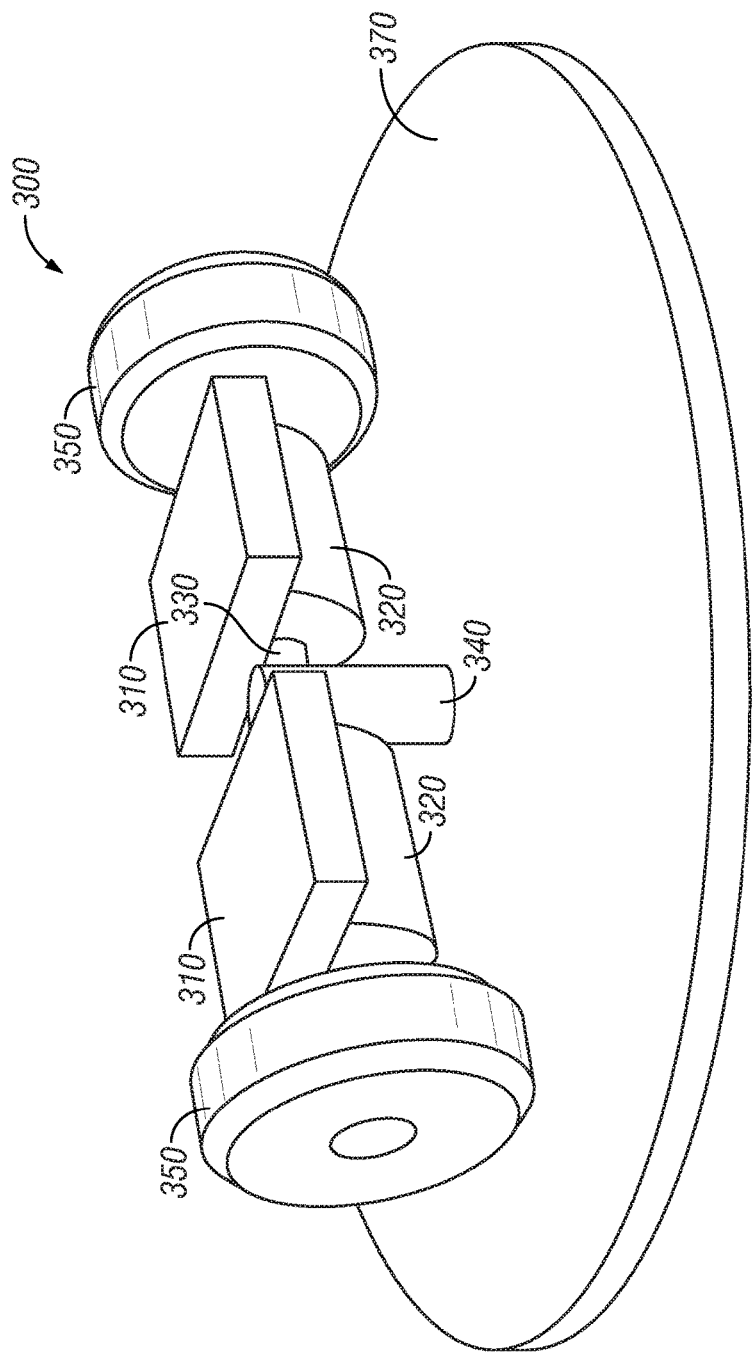
FIG. 3 illustrates a perspective view of an exemplary embodiment of the virtual reality locomotion apparatus on a rotatable platform.

FIG. 3 illustrates a perspective view of an exemplary embodiment of the virtual reality locomotion apparatus on a platform. In the present exemplary embodiment, the locomotion apparatus 300 rotates around a fixed point (the fixed point being the central pivot 340), and the user is able to feel the movement of the locomotion apparatus 300 around the fixed point on the platform 370. Because the locomotion apparatus 300 is fixed to the platform 370, the user will not encounter any obstacles in real life. In the present exemplary embodiment, the wheels 350 act to support the user's weight and the central pivot 340 serves to keep the locomotion apparatus 300 connected to and attached to the platform 370. The central pivot 340 rotates on an axis perpendicular to the platform 370 and that passes through the center of the platform 370. The rotation of the footpads 310 in particular orientations actuate the rotation of locomotion apparatus 300 around the axis through which the central pivot 340 passes. Actuating the rotation of the locomotion apparatus can include actuating the wheels 350 in a certain orientation corresponding to the orientation of the footpads 310 by the user.

In an exemplary embodiment, the user can indicate a certain left or right rotation in a virtual reality environment by angling one footpad forward and another footpad backward and for rotation of the locomotion apparatus 300. For example, to rotate counterclockwise, the user can angle the left footpad down by using the heel of his left foot and can angle the right footpad down by using the balls of his right foot. Similarly, to rotate clockwise, the user can angle the left footpad down by using the balls of his left foot and can angle the right footpad down by using the heel of his left foot. Generally, to rotate in either direction, the user can angle the footpads 310 in different and opposite directions to get the correct locomotion rotation in the virtual reality environment and to actuate the rotation the locomotion apparatus 300.

The present exemplary embodiment can be used to indicate a forward or backward motion or locomotion using similar footpad orientations as the illustrative embodiments of FIGS. 1 and 2. For example, to move forward in the virtual reality environment, the user can angle the left footpad and right footpad down by using the balls of both feet, and to move backward in the virtual reality environment, the user can angle the left footpad and right footpad down by using the heels of both feel. However, because the locomotion apparatus 300 of the present exemplary embodiment is fixed in position by the central pivot 340, the user will not be able to experience or feel any forward or backward motion of the locomotion apparatus 300 itself in real life. Forward and backward motion or locomotion in the virtual reality environment can still be simulated by environmental simulators which are discussed below.

Since the apparatus 300 can travel in an arc when the footpads 310 are angled to different degrees, but in the same direction (either forward or backward). The rotation of the apparatus 300 (and the user's body) will correspond to the tangent of the arc on which the user is 'traveling' in the virtual environment.

In one embodiment, the rotation of the user is controlled by output of the virtual reality system rather than by an autonomous action of the apparatus 300 in response to the foot movements. This enables support of a possible situation in virtual reality where the "movement of the user" is blocked in the virtual environment due to an obstacle and the rotation of the user should correspondingly be blocked. A short motor action back and forth may be actuated to simulate hitting the obstacle.

Figure 4:
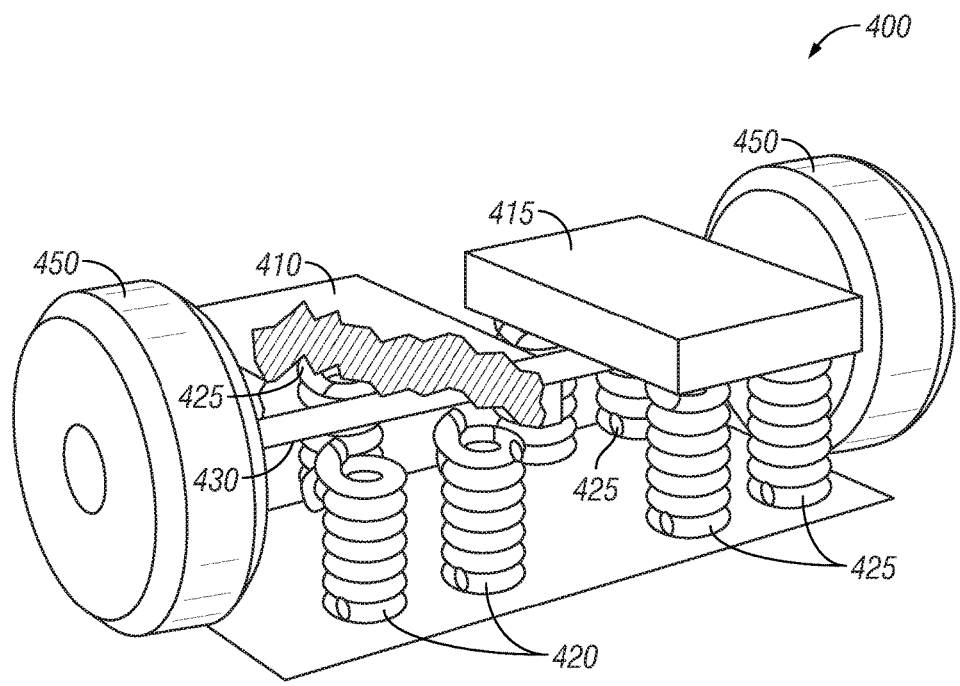
FIG. 4 illustrates a perspective and partially cut-away view of an exemplary embodiment of the virtual reality locomotion apparatus.

FIG. 4 illustrates a perspective and partially cut-away view of an exemplary embodiment of the virtual reality locomotion apparatus. Similar to the embodiment of FIG. 1, the wheels 450 are optionally non-functional and give the impression of motion and locomotion to the user. The user interacts with the footpads 410 and 415 to create any motion or locomotion in the virtual reality system, and the footpads 410 and 415 in the present exemplary embodiment are supported by springs 420 and 425 for footpads 410 and 415 respectively. The user can actuate the footpads 410 and 415 in a similar manner as the footpads 100 in FIG. 1. For example, to turn left, the user can angle the left footpad down by using the heel of his left foot and can angle the right footpad down by using the balls of his right foot. Similarly, to turn right, the user can angle the left footpad down by using the balls of his left foot and can angle the right footpad down by using the heel of his left foot. The angling of the footpads creates a vertical downward force against the springs 420 and 425 upon which the footpads 410 and 415 are disposed.

The force on the springs 420 and 425 can be detected by sensors (not illustrated). In one embodiment, the springs 420 and 425 themselves can be sensors via being piezo-electric, and any force exerted on them can be transformed into an electrical signal that can be interpreted by a processor. In another embodiment, the springs 420 and 425 are located on top of sensors, which can be piezo-electric sensors, and the sensors detects any changes in vertical downward force on the springs 420 and 425, which then are then sent to a processor for interpretation.

Any number of springs 420 and 425 and arrangement thereof can be used for the footpads 410 and 415. The present exemplary embodiment includes four springs 420 for footpad 410 and four springs 425 for footpad 415. The springs 420 for footpad 410 are positioned near the four corners of the footpad 410 (not all springs illustrated) and the springs 425 for footpad 415 may be positioned near the four corners of the footpad 415 (not all springs illustrated).

In the present exemplary embodiment, the footpads 410 and 415 are connected to the wheels 450 by an axle 430, and in other embodiments, the footpads 410 and 415 are connected to the wheels by other currently available or later existing mechanisms for connecting these components. The axle connects the centers of the wheels 450 and is disposed on the bottom sides of the footpads 410 and 415. The axle stabilizes the two footpads and in one embodiment, the footpads 410 and 415 can rotate around the axis formed by the axle 430. In one embodiment, the footpads 410 and 415 comprises ports on the bottom sides of the footpads 410 and 415 through which the axle 430 passes, and thereby allowing for rotation of the footpads 410 and 415 on the axle 430. Optionally, axial housings similar to those shown in FIGS. 1-3 can be incorporated with the footpads 410 and 415 to accommodate the axle 430.

In an additional embodiment, each footpad 410 and 415 can be supported by a footpad pivot (not illustrated). These footpad pivots allow the footpads 410 and 415 to tilt in any direction while the footpads 410 and 415 are supported by the springs 521-524, and 526-529, or any currently available or later developed means of supporting the footpads 410 and 415. These footpad pivots are shaped to allow for the tilting of the footpads 410 and 415, such as a pyramid, cone, or post, and these footpad pivots can connect to the footpads 410 and 415 via a ball joint mechanism.

Figure 5:
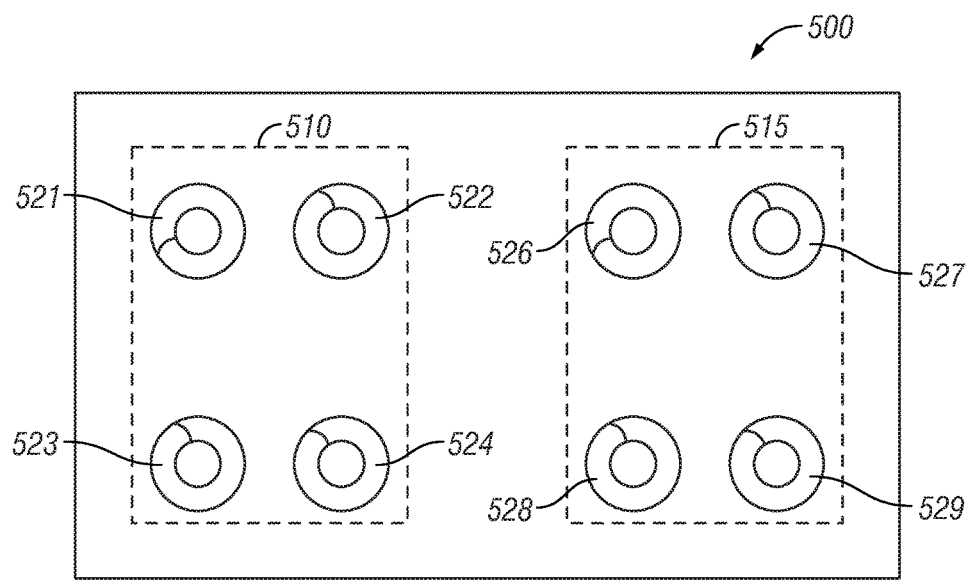
FIG. 5 illustrates a top and partially cut-away view of an exemplary embodiment of an exemplary embodiment of the virtual reality locomotion apparatus.

FIG. 5 illustrates a top view of an exemplary embodiment of the virtual reality locomotion apparatus. FIG. 5 illustrates the footpads 510 and 515 in dotted lines so the placement of the springs 521-524, and 526-529 underneath the footpads 510 and 515 are more clearly defined. As mentioned with regards to the exemplary embodiment illustrated in FIG. 4, the springs 521-524, and 526-529 are located near the corners of the footpads 510 and 515.

Sensors (not illustrated) connected to the springs 521-524, and 526-529 detect any changes in the pressure or force exerted against the springs 521-524, and 526-529. In an exemplary embodiment, the sensors can detect changes in pressure or force exerted on the springs and transmit these detected changes in pressure or force to a virtual reality system, and the virtual reality system will in turn affect the user's visual display of the virtual reality environment according to the below Table 1:

TABLE 1

| Motion in Virtual Reality Environment | Left Footpad 510 | Right Footpad 515 |
|---|---|---|
| Rotate Counterclockwise | 523 + 524 | 526 + 527 |
| Rotate Clockwise | 521 + 522 | 528 + 529 |
| Forward | 521 + 522 | 526 + 527 |
| Reverse/Backward | 523 + 524 | 528 + 529 |
| Ascending | 522 + 524 | 527 + 529 |
| Descending | 521 + 523 | 526 + 528 |

Any combination or arrangement of sensors and/or springs may be used to effectuate different motions and locomotion in a virtual reality environment, and Table 1 and FIG. 5 provide an example of a combination and arrangement of sensors and/or springs in an exemplary embodiment.

Figure 6:
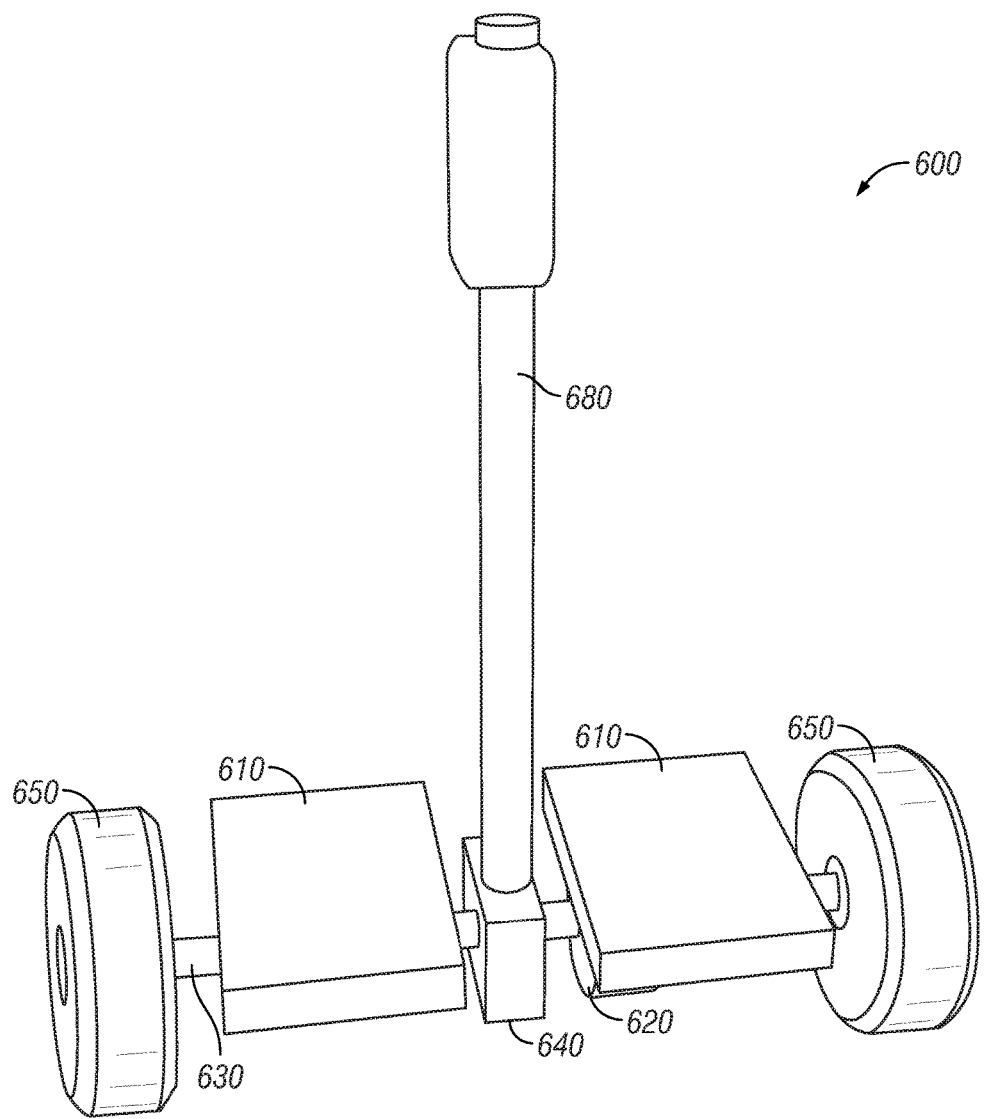
FIG. 6 is a perspective view of an exemplary embodiment of the virtual reality locomotion apparatus.

FIG. 6 is a perspective view of an exemplary embodiment of the virtual reality locomotion apparatus. This present exemplary embodiment of the virtual reality locomotion apparatus 600, like FIGS. 1-3, includes footpads 610 and axial housings 620 that rotate around an axle 630. The axle 630 passes through and is stabilized by the central stanchion 640, and optionally, the axle 630 can be stabilized by wheels 650 that can act as additional support for the locomotion apparatus 600. This present exemplary embodiment includes a central joystick 680 that a user can use to affect the visual display from the virtual reality system.

In one embodiment, the central joystick 680 is disposed on the central stanchion 640, and the connection between the central joystick 680 and the central stanchion 640 can comprise a ball joint mechanism that detects any changes in orientation of the central joystick 680. A ball joint mechanism for the joystick 680 allows the user to manipulate the user's visual display from the virtual reality system.

In another embodiment, the central joystick 680 passes through the central stanchion 640 and is disposed on the axle 630, and accordingly the central joystick 680 rotates on the axle 630 and around the axis through which the axle 630 passes. The rotation of the central joystick 680 can simulate ascent and descent of the user in the virtual reality environment, or can allow the user to manipulate the user's visual display from the virtual reality system.

While the present exemplary embodiment includes the central joystick 680 disposed between the footpads 610, in yet another embodiment, the locomotion apparatus 600 can include more than one joystick for use and operation by the user. Joysticks can be disposed on the stanchions at the ends of the locomotion apparatus 600, and any number of joysticks can be used with the locomotion apparatus 600.

Any currently available or later developed mechanism for connecting the central joystick 680 to the central stanchion 640 or to the axle 630 may be used, and any currently available or later developed sensor technology may be used to detect any motion or movement of the central joystick 680. Furthermore, the present exemplary embodiment of FIG. 6 can incorporate any features, principles, and/or techniques used with the exemplary embodiments of FIG. 1-5.

Figure 7:
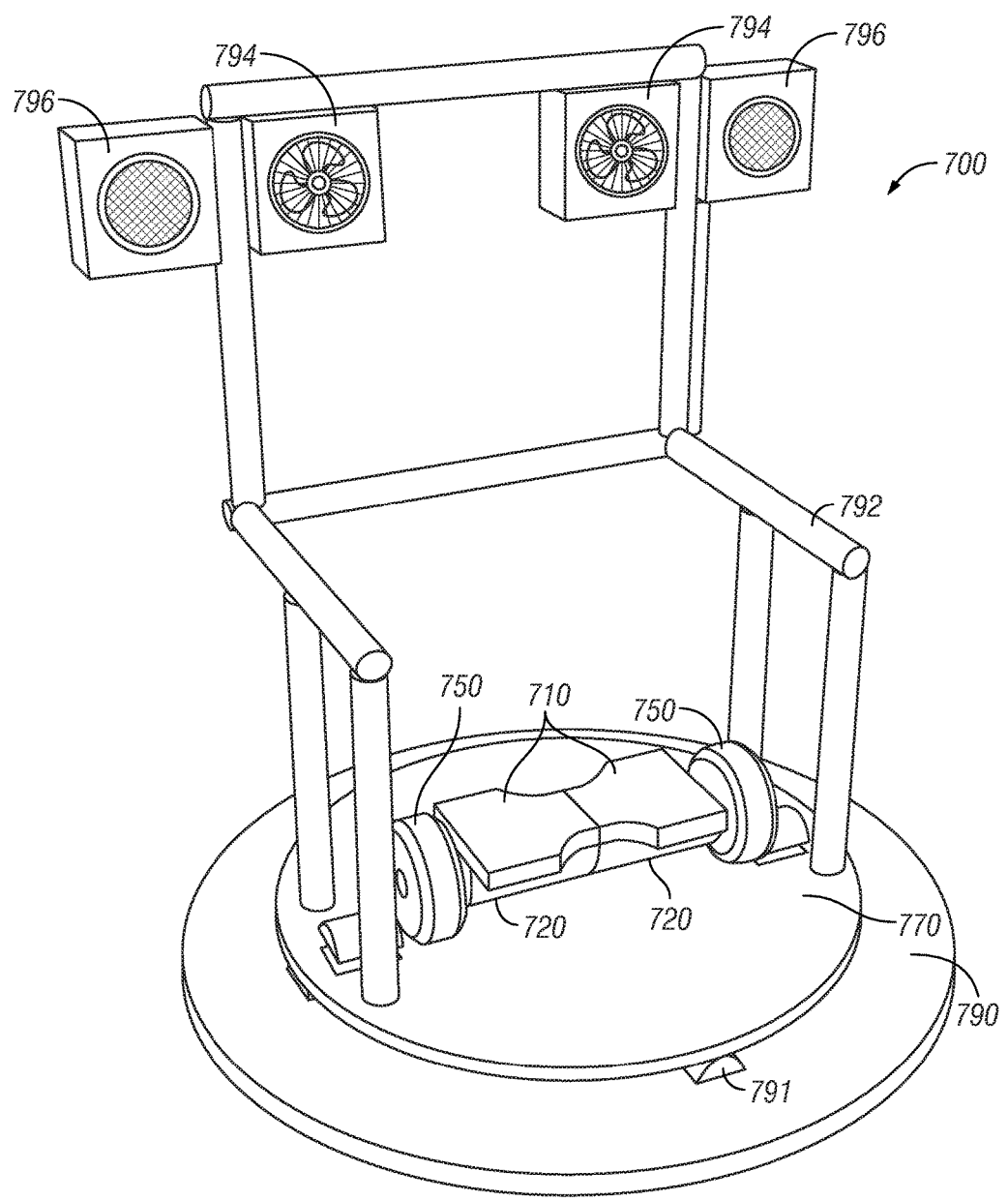
FIG. 7 illustrates an exemplary embodiment of the virtual reality locomotion apparatus with environmental simulators.

FIG. 7 illustrates an exemplary embodiment of the virtual reality locomotion apparatus with environmental simulators. The illustrative embodiment of FIG. 7 is similar to the exemplary embodiment of FIG. 3 in that FIG. 7 illustrate a locomotion apparatus 700 fixed to a platform 770 by a wheel stanchions 750. The present exemplary embodiment of the locomotion apparatus 700 does not rotate on top of the platform 770 like the locomotion apparatus of FIG. 3. Instead, the platform 770 rotates on a base 790 so that the user can feel the locomotion or motion displayed in the virtual reality environment in real life. The platform 770 is fixed to the base 790 by the wheel stanchions 750 or any other currently available or later developed mechanism for affixing the platform 770 to the base 790, so that the platform 770 can rotate around an axis passing through the central pivot 740. The exemplary embodiment includes rollers 791 disposed between the base 790 and the platform 770. These rollers 791 actuate when the user changes the orientation of the footpads 710. Any currently available or later developed mechanism for rotating the platform 770 on the base 790 can be used for the exemplary embodiment.

As mentioned with FIG. 3, the user can indicate a certain left or right rotation in a virtual reality environment by angling one footpad forward and another footpad backward and for rotation of the locomotion apparatus 700. For example, to turn left, the user can angle the left footpad down by using the heel of his left foot and can angle the right footpad down by using the balls of his right foot. Similarly, to turn right, the user can angle the left footpad down by using the balls of his left foot and can angle the right footpad down by using the heel of his left foot. Generally, to turn in any direction, the user can angle the footpads 710 in different and opposite directions to get the correct locomotion rotation in the virtual reality environment and to actuate the rotation of the platform 770 on the base 790.

Further, the present exemplary embodiment comprises environmental simulators supported on a frame 792 disposed on the platform 770. The frame 792 can be shaped and oriented in any configuration. In another embodiment, the frame 792 can be disposed on the base 790 instead of the platform 770 and environmental simulators can located anywhere on the frame surrounding the user and the platform 770 to give the user as close to a full-immersion experience with the virtual reality system.

The environmental simulators can comprise fans 794 and speakers 796 that provide real-life sensations to the user of the virtual reality environment. For example, the fans 794 can provides a touch-based sensory input to the user: while the virtual reality system cannot simulate any touch-based input, the fans 794 can actuate so that the user can visual the effects of wind and can feel air circulation on his wind that emulates the wind of the virtual reality environment. Similarly, where the virtual reality system does not provide any audio device such as headphones, the speakers 796 of the present exemplary embodiment can provide audio-based input.

Figure 8:
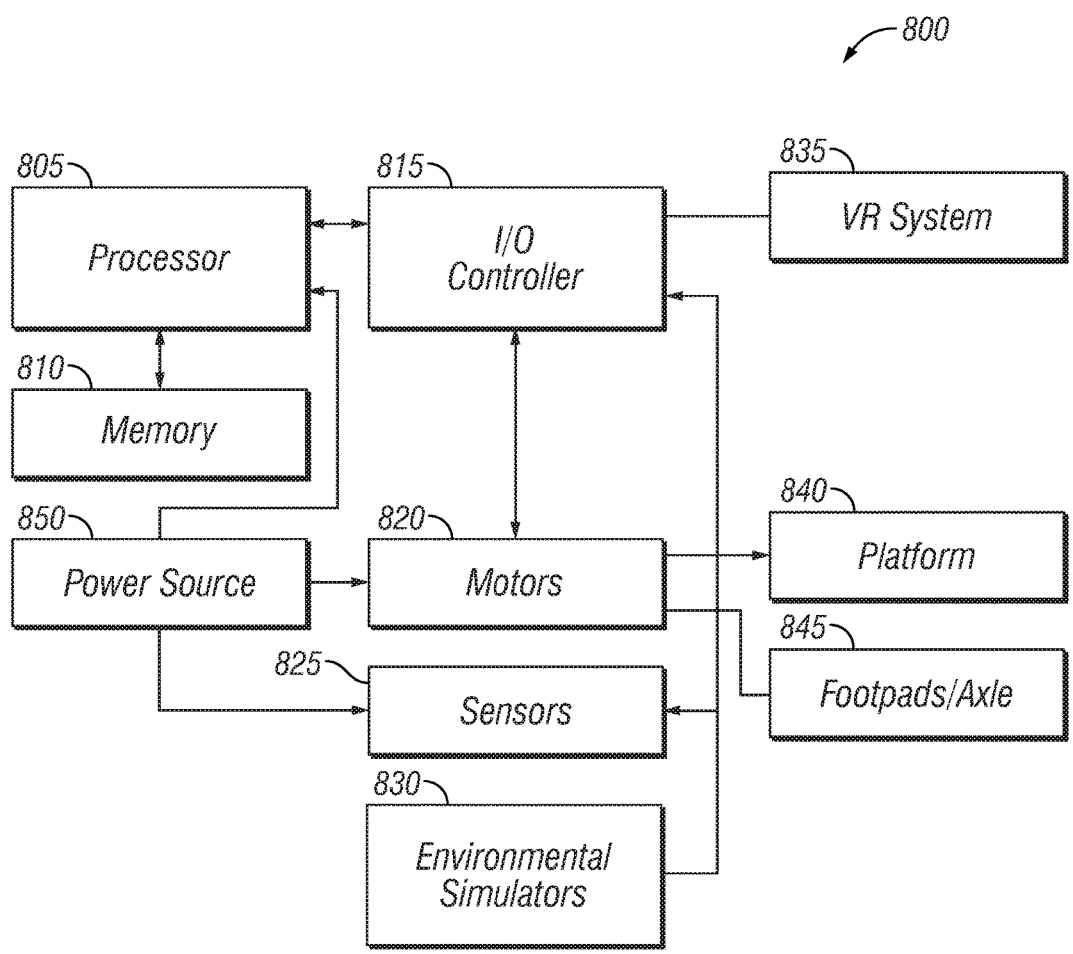
FIG. 8 illustrates a block diagram of components of an exemplary embodiment of the virtual reality locomotion apparatus.

FIG. 8 illustrates a block diagram of components of an exemplary embodiment of the virtual reality locomotion apparatus. In an exemplary embodiment, the virtual reality locomotion apparatus 800 can be controlled by a processor 805 connected to memory 810, which includes readable computer instructions for the processor 805. The processor 805 communicates with an I/O (input/output) controller 815 that manages the input and output signals to the various input and output devices and controllers of the virtual reality locomotion apparatus 800. These input and out devices include the motor 820, sensors 825, and environmental simulators 830. The I/O controller 815 also manages communication with the virtual reality (VR) system 835, and the communication can be through a wired connection or through a wireless connection. Additionally, a power source 850 is included in the locomotion apparatus 800 so as to supply power to various components, and the power source may be a battery or an AC adapter. In an exemplary embodiment, the virtual reality locomotion apparatus 800 contains a subset of these components. For example, the processor 805, memory 810, I/O controller 815, motor 820, sensors 825, and environmental simulators 830 are contained inside the virtual reality locomotion apparatus 800 as disclosed previously. Some environmental simulators 830, the platform 840, the power source 850, and the VR system 835 are components that are not contained inside the locomotion apparatus 800 in some exemplary embodiments.

The processor 805 reads computer-readable instructions from memory 810 and upon input from the VR system 835 through the I/O controller 815, transmits actuation signals to various input and output devices through the 110 controller 815. The processor 805 through the I/O controller 815 controls the motor 820, speakers 825, and environmental simulators 830. The processor 805 in turn through the I/O controller 815 receives information from the sensors 825, and then after processing information from these devices, passes the information through the I/O controller 815 to the VR system 835. The information received by the I/O controller 815 may be wired or wireless. One of ordinary skill in the art would understand how to select, program, and use the processor 805, memory 810, and I/O controller 815 for the locomotion apparatus 800 as disclosed herein.

As mentioned previously, the motor 820 is controlled by the processor 805 through the I/O controller 815. The motor 820 automates and actuates the virtual reality locomotion apparatus 800. In one embodiment, the motor 820 can actuate the axle or the footpads 845 of the locomotion apparatus 800 to stabilize the footpads 845 for use by the user. In another embodiment, the motor 820 actuates the rotation of the locomotion apparatus 800 on a platform 840, such as in the locomotion apparatus of FIG. 3. The motor 820 can actuate the movements and rotation of the footpads and/or axle 845. In yet another embodiment, the motor 820 actuates the rotation of the platform 840 on the base 790 as shown in FIG. 7, and the footpads are stabilized in the nominal parallel position by springs and/or solenoids. The locomotion apparatus 800 can comprise any number of motors to actuate its various components. One of ordinary skill in the art would understand how to choose and implement the motors for the locomotion apparatus 800.

As mentioned previously, the sensors detect changes in the footpads of the locomotion apparatus 800 and transmits signals to the processor 805 through the I/O controller 815. The sensors 820 can include gyroscopes, piezo-electric sensors, and any other type of sensors, currently available, or later developed, that can be used to detected changes in the footpads of the locomotion apparatus 800. One of ordinary skill in the art would understand how to choose and implement sensors 820 for the locomotion apparatus 800.

Also mentioned previously, the environmental simulators 830 are controlled by the processor. The environmental simulators 830 can include vibrators, fans, speakers, and any other device that can be used to simulate in real-life the actions, sounds, and environment inside the virtual reality environment. One of ordinary skill in the art would know and understand how to implement the environmental simulators 830 for the locomotion apparatus 800 in response to input and output from the virtual reality system 835.

Figure 9:
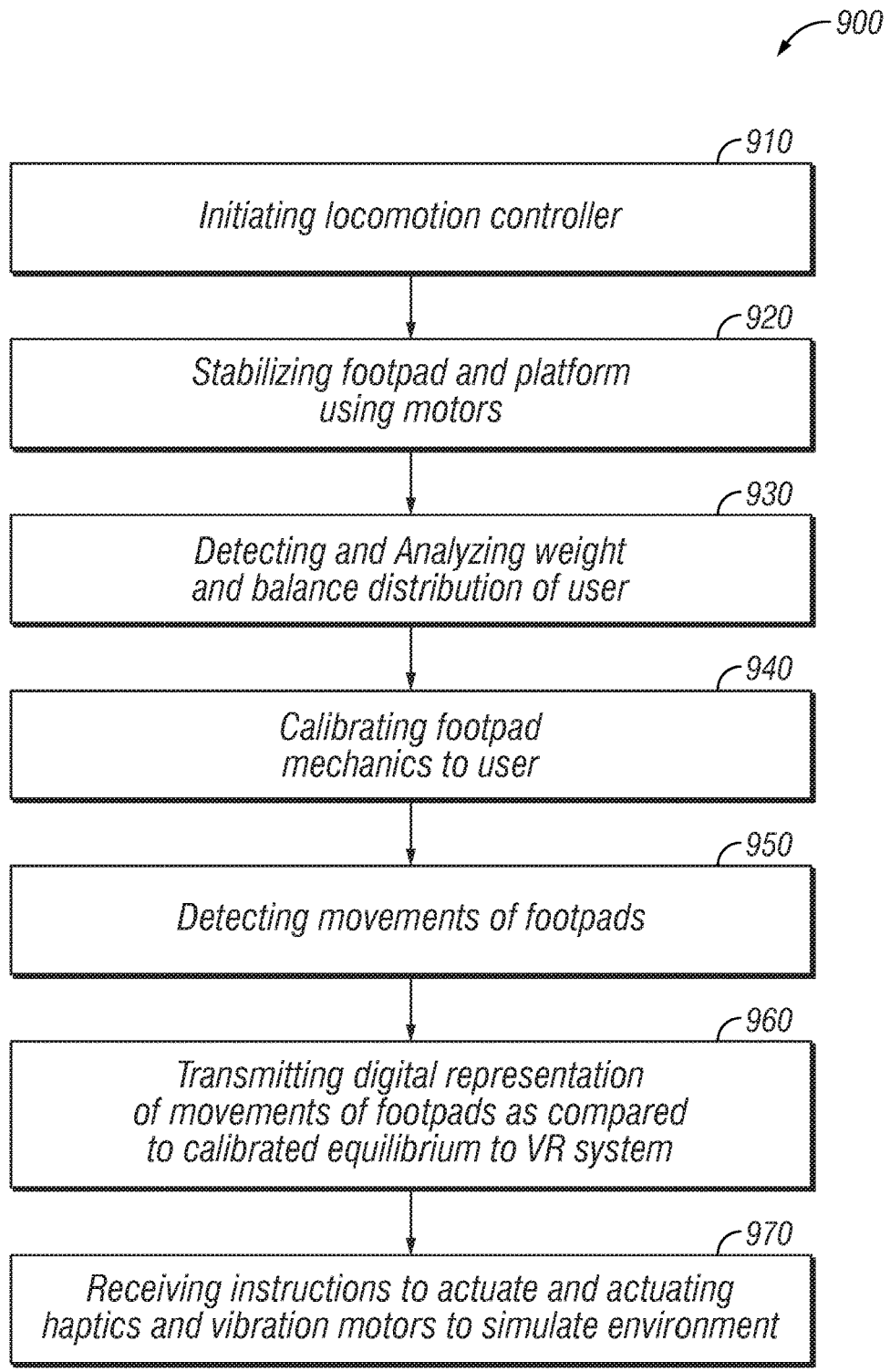
FIG. 9 is a flowchart of a process for using the virtual reality locomotion apparatus with a virtual reality system.

FIG. 9 is a flowchart of a process for using the virtual reality locomotion apparatus with a virtual reality system. The steps of flowchart 900 may be implemented by a virtual reality locomotion apparatus, such as the virtual reality locomotion apparatus exemplified in and disclosed in FIGS. 1-8.

The process begins by initializing the locomotion apparatus (step 910). The user can press a power button that will begin initializing the processor and other components of the locomotion apparatus.

Once the locomotion apparatus is initialized, the footpads and platform are stabilized using motors, solenoids, or springs of the locomotion apparatus (step 920). Users may leave the footpads at an angle to the ground or to the platform, or the platform may be rotated away from its initial position on the base. Accordingly, the locomotion apparatus resets the position of the footpads and platform to their original and/or initial orientation and position. Resetting the footpads and platform allows a user to more easily mount the locomotion apparatus.

Once the footpad and platform are stabilized, a user can stand on the locomotion apparatus and the locomotion apparatus detects and analyzes the weight and balance distribution of the user on the locomotion apparatus (step 930). Because each user is different, the locomotion apparatus detects how the user stands on the locomotion apparatus by detecting the weight and balance distribution of the user on the sensors and/or springs of the locomotion apparatus.

Then, the locomotion apparatus calibrates the footpad mechanics to the user (step 940). Using the detected and analyzed weight and balance distribution of the user from step 930, the locomotion apparatus calibrates the footpad mechanics to respond to the user. Changes in the pressure of the footpads can differ so the locomotion apparatus calibrates these changes in motion for users.

The user can then operate the locomotion apparatus using their feet in response to a visual display by the virtual reality system, and the locomotion apparatus detects movements of the footpads (step 950). As mentioned previously, the locomotion apparatus detects the movements of the footpads using sensors.

The locomotion apparatus transmits a digital representation of the rotation of the footpads to the virtual reality system (step 960), and this digital representation may be in comparison to the calibrated equilibrium determined by the locomotion apparatus in step 930. The digital representation is generated based on signals from the sensors of the locomotion apparatus, and the digital representation can be customized based on the virtual reality system used with the locomotion apparatus.

The locomotion apparatus then receives instructions from the virtual reality system to actuate various components, and the locomotion apparatus actuates environmental simulators in response to the instructions from the virtual reality system (step 970). The instructions from the virtual reality system can include instructions to actuate some of the environmental simulators of the locomotion apparatus, such as vibrators, fans, speakers, and any other device that can be used to simulate in real-life actions and things in a virtual reality environment. The locomotion apparatus can be implemented to interface with any currently available or later developed virtual reality system.

Other embodiments of the locomotion apparatus may be used to navigate drones, robots, or other types of device requiring locomotion and navigation. These embodiments may be used with an augmented reality system, or any other type of currently available or later developed system for viewing or simulating an environment.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than recited unless the particular claim expressly states otherwise.

ADDITIONAL DESCRIPTION

The following paragraphs are offered as further description of the various embodiments of the disclosed invention.

In a first embodiment, novel aspects of the present disclosure describe a virtual reality locomotion apparatus comprising: a stanchion for supporting two footpads, wherein the two footpads rotate on an axis passing through the stanchion; a plurality of sensors that detect the rotation of each footpad; and a controller transmitting signals from the plurality of sensors representing the rotation of each footpad to a virtual reality system.

In another aspect of the first embodiment, novel aspects of the present disclosure describe a virtual reality locomotion apparatus comprising: a stanchion for supporting two footpads, wherein the two footpads rotate on an axis passing through the stanchion; a plurality of sensors that detect the rotation of each footpad; and a controller transmitting signals from the plurality of sensors representing the rotation of each footpad to a virtual reality system, and one or more limitations selected from the following list:

wherein the system further comprises a second stanchion for supporting the two footpads, wherein the axis also passes through the second stanchion;

wherein the system further comprises an illusory wheel attached to a first end of the stanchion.

wherein the system further comprises a plurality of environmental simulators.

wherein at least one of the environmental simulators comprises vibrators.

wherein at least one of the environmental simulators comprises fans.

wherein at least one of the environmental simulators comprises speakers.

wherein the system further comprises a central rotatable post wherein, the plurality of sensors detect rotation of the central rotatable post and the controller transmits signals representing the rotation of the central rotatable post to the virtual reality system.

wherein the controller receives output signals from the virtual reality system to actuate the environmental simulators.

wherein the system further comprises a platform for the stanchion, wherein the rotation of the footpads actuates rotation of the stanchion on a platform axis perpendicular to the platform.

In a second embodiment, novel aspects of the present disclosure describe a method for virtual reality locomotion, comprising: stabilizing footpads of a virtual reality locomotion apparatus using motors controlled by a locomotion controller; detecting the rotation of the footpads on an axis passing through the footpads via sensors of the footpads that detect rotation of the footpads; and transmitting a digital representation of the rotation of the footpads to a virtual reality system.

In another aspect of the second embodiment, novel aspects of the present disclosure describe a method for virtual reality locomotion, comprising: stabilizing footpads of a virtual reality locomotion apparatus using motors controlled by a locomotion controller; detecting the rotation of the footpads on an axis passing through the footpads via sensors of the footpads that detect rotation of the footpads; and transmitting a digital representation of the rotation of the footpads to a virtual reality system; and one or more limitations selected from the following list:

wherein the method further comprises calibrating signals from the sensors of the footpads.

wherein the method further comprises detecting and analyzing weight and balance distribution of a user, when the user stands on the footpads, using the sensors;

wherein the method further comprises actuating a plurality of environmental simulators upon receiving instructions from the virtual reality system.

wherein at least one of the environmental simulators comprises vibrators.

wherein at least one of the environmental simulators comprises fans.

wherein at least one of the environmental simulators comprises speakers.

wherein the virtual locomotion apparatus comprises a stanchion for supporting two footpads.

wherein the method further comprises rotating the virtual locomotion apparatus on a stationary platform in response to the rotation of the footpads.

wherein the method further comprises transmitting a digital representation of rotation of a central locomotion post to the virtual reality system.

The invention claimed is:

1. A stationary virtual reality apparatus to direct locomotion in a virtual reality environment, comprising:
   two separate footpads moveably coupled to a stanchion, wherein the two footpads independently move relative to at least one axis;
   a plurality of sensors that detect the independent movement of each footpad; and
   a controller configured for receiving and transmitting signals from the plurality of sensors to a virtual reality system, wherein the signals comprise the detected independent movement of each footpad.

2. The apparatus of claim 1, further comprising a second stanchion for supporting the two footpads, wherein the axis also passes through the second stanchion.

3. The apparatus of claim 1, further comprising a wheel attached to a first end of the stanchion.

4. The apparatus of claim 1, further comprising a plurality of environmental simulators.

5. The apparatus of claim 4, wherein at least one of the environmental simulators comprises vibrators.

6. The apparatus of claim 4, wherein at least one of the environmental simulators comprises fans.

7. The apparatus of claim 1, further comprising a processor, wherein the processor analyzes movement of the footpads.

8. The apparatus of claim 1, further comprising a central rotatable joystick wherein, the plurality of sensors detect rotation of the central rotatable joystick and the controller transmits signals representing the rotation of the central rotatable joystick to the virtual reality system.

9. The apparatus of claim 4, wherein the controller receives output signals from the virtual reality system to actuate the environmental simulators.

10. The apparatus of claim 1, further comprises a platform for the stanchion, wherein the rotation of the footpads actuates rotation of the stanchion on a platform axis perpendicular to the platform.

11. A method to direct locomotion in a virtual reality environment, comprising:
    stabilizing two separate footpads of a stationary virtual reality apparatus using motors controlled by a locomotion controller, wherein the two separate footpads independently move to at least one axis;
    detecting the independent rotation of the footpads via sensors of the footpads that detect the independent rotation of the footpads; and
    transmitting a digital representation of the rotation of the footpads from the sensors of the footpads to a virtual reality system, wherein signals comprise the detected movement of each footpads.

12. The method of claim 11, further comprising calibrating signals from the sensors of the footpads.

13. The method of claim 11, further comprising detecting and analyzing weight and balance distribution of a user, when the user stands on the footpads, using the sensors.

14. The method of claim 11, further comprising actuating a plurality of environmental simulators upon receiving instructions from the virtual reality system.

15. The method of claim 13, wherein at least one of the environmental simulators comprises vibrators.

16. The method of claim 13, wherein at least one of the environmental simulators comprises fans.

17. The method of claim 13, further comprising analyzing the rotation of the footpads.

18. The method of claim 11, wherein the virtual locomotion apparatus comprises a stanchion for supporting two footpads.

19. The method of claim 11, further comprising rotating the virtual locomotion apparatus on a stationary platform in response to the rotation of the footpads.

20. The method of claim 11, further comprising transmitting a digital representation of rotation of a central locomotion joystick to the virtual reality system.

* * * * *